(12) United States Patent
Spadaccini et al.

(10) Patent No.: US 7,175,693 B2
(45) Date of Patent: Feb. 13, 2007

(54) METHOD FOR PREVENTING FUEL INFILTRATION INTO MICROPOROUS POLYMER MEMBRANES

(75) Inventors: Louis J. Spadaccini, Manchester, CT (US); He Huang, Glastonbury, CT (US); Foster Phillip Lamm, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 311 days.

(21) Appl. No.: 10/769,169

(22) Filed: Jan. 30, 2004

(65) Prior Publication Data
US 2005/0166754 A1 Aug. 4, 2005

(51) Int. Cl.
*B01D 53/22* (2006.01)

(52) U.S. Cl. .................................. 95/46; 96/6
(58) Field of Classification Search ............ 95/46; 96/6
See application file for complete search history.

(56) References Cited

U.S. PATENT DOCUMENTS

| | | | |
|---|---|---|---|
| 3,751,879 A | | 8/1973 | Allington |
| 5,051,114 A | | 9/1991 | Nemser et al. |
| 5,409,524 A | * | 4/1995 | Jensvold et al. ............... 96/8 |
| 5,876,604 A | | 3/1999 | Nemser et al. |
| 6,258,154 B1 | | 7/2001 | Berndt et al. |
| 6,315,815 B1 | | 11/2001 | Spadaccini et al. |
| 6,709,492 B1 | * | 3/2004 | Spadaccini et al. ............ 96/6 |
| 6,770,202 B1 | * | 8/2004 | Kidd et al. ................ 210/650 |
| 2003/0089660 A1 | | 5/2003 | Huang et al. |

FOREIGN PATENT DOCUMENTS

| | | |
|---|---|---|
| DE | 3941861 | 4/1991 |
| FR | 2656545 | 7/1991 |
| JP | 04265131 | 9/1992 |
| JP | 04265133 | 9/1992 |

OTHER PUBLICATIONS

"On-Line Fuel Deoxygenation for Coke Suppression," L.J. Spadaccini and H. Huang, ASME, vol. 125, Jul. 2003, p. 686. (Not § 102 prior art).
L. J. Spadaccini and H. Huang, Proceedings of TURBO EXPO 2002, ASME Turbo Expo: Land, Seat & Air 2002, Jun. 3-6, 2002, Amsterdam, The Netherlands GT-2002-30071.
U.S. Appl. No. 10/407,004, filed Apr. 4, 2003.
European Search Report, May 3, 2005.

* cited by examiner

*Primary Examiner*—Robert Hopkins
(74) *Attorney, Agent, or Firm*—Carlson, Gaskey & Olds

(57) ABSTRACT

A method for preventing fuel from migrating, i.e., infiltrating, into a mircoporous polymer membrane, such as that used in a fuel deoxygenator device of an aircraft to remove dissolved oxygen from the fuel, includes heating the membrane to reduce the size of micropores in the membrane from a first size to a second size that is large enough to allow migration of oxygen through the membrane and small enough to prevent migration of fuel into the membrane. The membrane is an amorphous fluoropolymer on a PVDF substrate and the micropores are reduced in size by heating the membrane at a temperature between 130° C. and 150° C. for 2 hours.

25 Claims, 4 Drawing Sheets

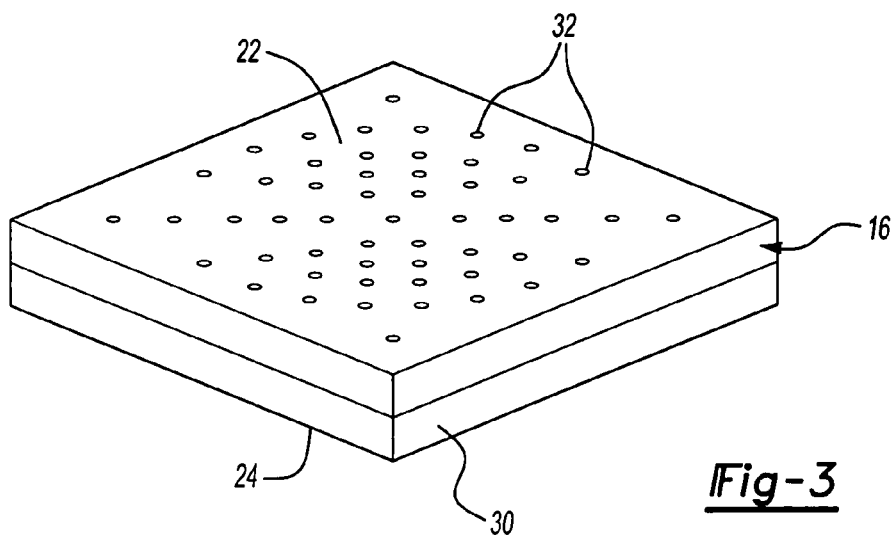
*Fig-3*
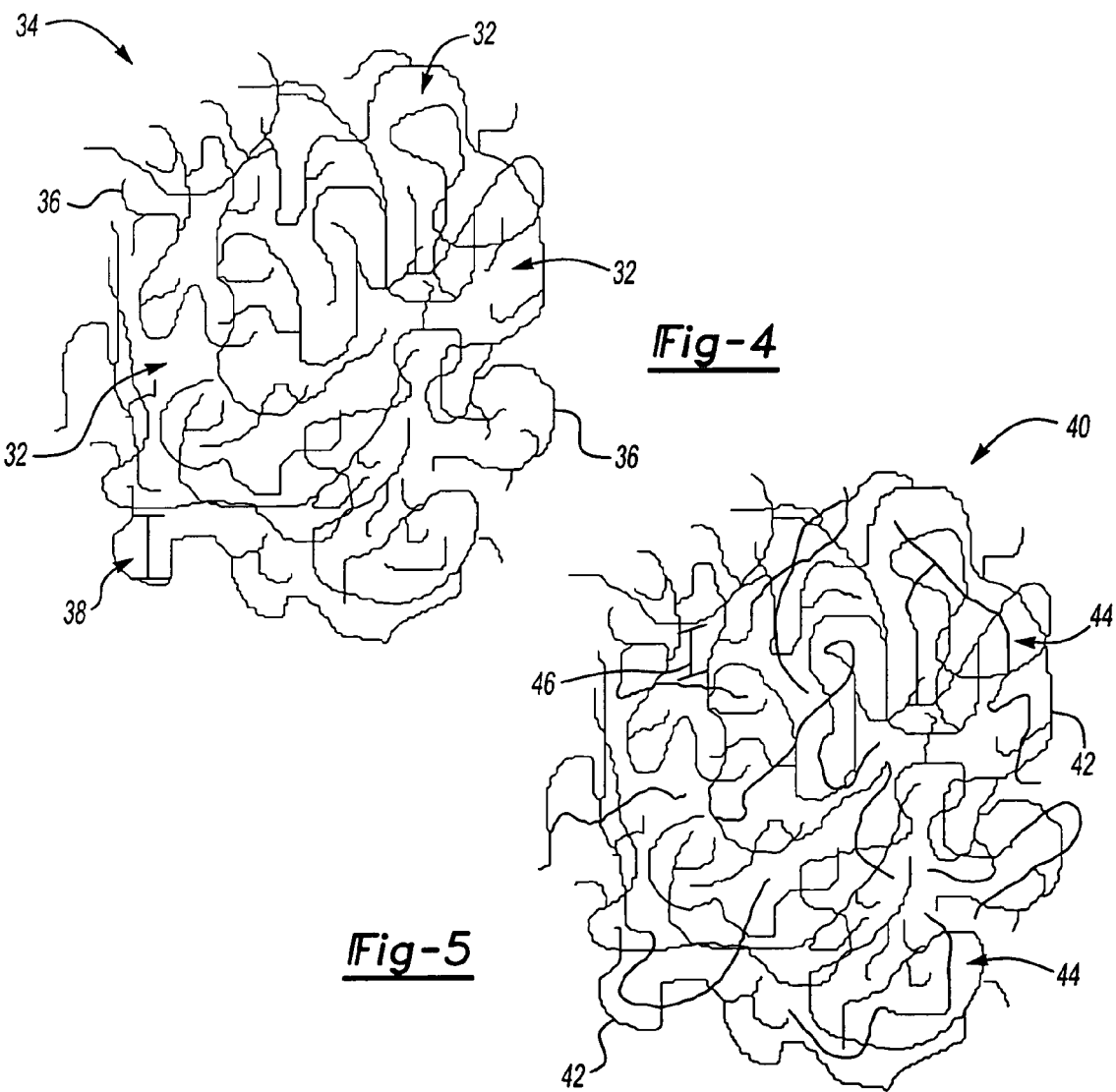
*Fig-4*
*Fig-5*

METHOD FOR PREVENTING FUEL INFILTRATION INTO MICROPOROUS POLYMER MEMBRANES

BACKGROUND OF THE INVENTION

This invention relates to a method for preventing fuel from infiltrating a microporous polymer membrane and a fuel deoxygenator device that uses the microporous polymer membrane to remove dissolved oxygen from fuel.

In a fuel system such as for an aircraft, fuel is mainly used to generate power. However, it also may be utilized as a coolant for various systems of the aircraft. Effective use of jet fuel as a coolant allows increases in operating temperatures of the aircraft and more efficient operation of the aircraft systems.

Jet fuel, like many other liquids, may absorb quantities of atmospheric gases. When jet fuel is in contact with air, oxygen from the air dissolves into the fuel. The absorbed gases may alter the chemistry of the fuel and affect the performance of the aircraft. For instance, the dissolved oxygen may react when heated above about 150° C. to form a free radical species. The free radical species initiate autoxidation reactions in the jet fuel that lead to the formation of carbonaceous deposits called "coke".

The presence of dissolved oxygen and coke deposits has several detrimental effects. First, the coke deposits may be carried through the fuel delivery system of the aircraft and hinder the functionality of various components in the system. Second, the presence of oxygen and formation of coke deposits limit the use of the jet fuel as a coolant. For instance, jet fuel with dissolved oxygen forms coke deposits above about 150° C., so the operating temperature of the aircraft system cooled by the jet fuel is limited to about 150° C. to minimize the formation of the coke deposits. On the other hand, if the jet fuel is deoxygenated, it may be heated to about 450° C. without forming significant coke deposits.

There is at least one existing method of gas separation that may be suitable for removing dissolved oxygen from the jet fuel; however, the existing membranes for use with this method are not suitable. The method involves transferring a gas between two fluids through a membrane filter. This known method has been used for separating a particular gas from a mixture of gases or separating a particular gas dissolved in an aqueous solution but has not been entirely successful for jet fuel because of insufficient quality of the membranes.

One device for removing dissolved oxygen uses a gas-permeable membrane disposed within the fuel system. As fuel passes along the permeable membrane, oxygen molecules in the fuel diffuse out of the fuel across the gas-permeable membrane. An oxygen partial pressure differential across the permeable membrane drives oxygen from the fuel as it passes over the membrane.

Conventional gas-permeable membranes used in the above devices are produced using known methods such as solvent casting, melt casting, or other coating technique. The conventional membranes produced using these techniques have not yielded a membrane of sufficiently high quality for separation of oxygen in jet fuels though.

One of the primary detriments of conventional membranes is the effect of "micropores" in the membrane. Micropores are the free volume space between the molecules of the polymer that makes up the membrane. The free volume space forms a pathway, or micropore, through the membrane that enables molecules to permeate, i.e., migrate, from one side of the membrane to the other side of the membrane. In conventional membranes the size of the micropores is too large, allowing fuel, for example, to migrate into and infiltrate the membrane. As fuel infiltrates the membrane, the membrane becomes less effective in removing dissolved oxygen and incapable of sufficiently removing dissolved oxygen from the fuel.

Accordingly, a method for preventing fuel infiltration into a microporous polymer membrane is needed for such oxygen removing devices.

SUMMARY OF THE INVENTION

In general terms, this invention is a method for preventing fuel from infiltrating a microporous polymer membrane and a fuel deoxygenator device that uses the microporous polymer membrane to remove dissolved oxygen from fuel.

In one example, the microporous polymer membrane is heat treated to reduce the size of micropores in the microporous polymer membrane. The micropores are large enough to generally allow migration of oxygen molecules and small enough to generally prevent infiltration of the fuel.

In another example, the heat treatment includes heating the microporous polymer membrane at a predetermined temperature between 130° C. and 150° C. for a predetermined time of two hours. The predetermined temperature is about equal to or greater than the glass transition of the polymer of the microporous polymer membrane.

In another example, the polymer of the microporous polymer membrane is an amorphous fluoropolymer, Teflon AF2400, that is heat treated to reduce the size of the micropores. Teflon AF2400 has a glass transition of approximately 240° C. The predetermined heat treating temperature is between 130° C. and 150° C. and the predetermined heating time is two hours.

In another example, a microporous polymer membrane according to the invention is used in a fluid separating device, such as a fuel deoxygenator that is used in an aircraft fuel system to remove dissolved oxygen from the aircraft fuel. Fuel enters the deoxygenator device and flows in contact with the microporous polymer membrane. The dissolved oxygen passes through the membrane and is thereby removed from the fuel; however, the fuel is not able to infiltrate the microporous polymer membrane.

The various features and advantages of this invention will become apparent to those skilled in the art from the following detailed description of the currently preferred embodiments. The drawings that accompany the detailed description can be briefly described as follows.

BRIEF DESCRIPTION OF THE DRAWINGS

FIG. 3 is a schematic drawing of an example microporous polymer membrane;

FIG. 4 is a molecular 2-dimensional view of a known virgin microporous polymer membrane;

FIG. 5 is one example of a molecular 2-dimensional view of a microporous polymer membrane that has been heat treated according to the inventive method;

DETAILED DESCRIPTION OF THE PREFERRED EMBODIMENT

Figure 1:
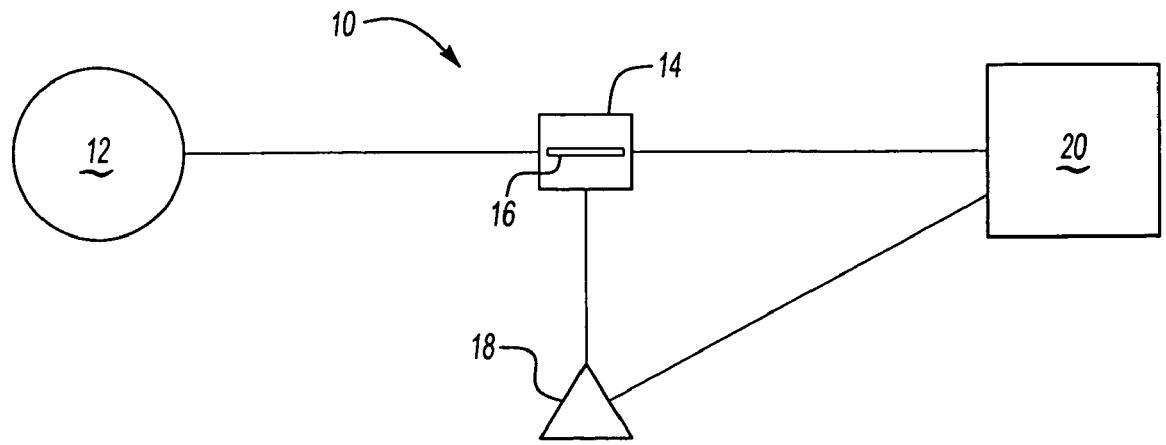
FIG. 1 is a general environmental view of a microporous polymer membrane in a fuel deoxygenator device of an aircraft.

FIG. 1 schematically illustrates a fuel system 10 of an aircraft, including a fuel storage tank 12 that is in fluid communication with a fuel deoxygenator device 14. The fuel deoxygenator device 14 includes a microporous polymer membrane 16 to remove dissolved oxygen from the aircraft's fuel, making the fuel more efficient for use as a coolant for various aircraft systems and components 18. Ultimately the fuel is used downstream from either the fuel deoxygenator 14 or the aircraft systems and components 18 by the aircraft engine 20.

Figure 2:
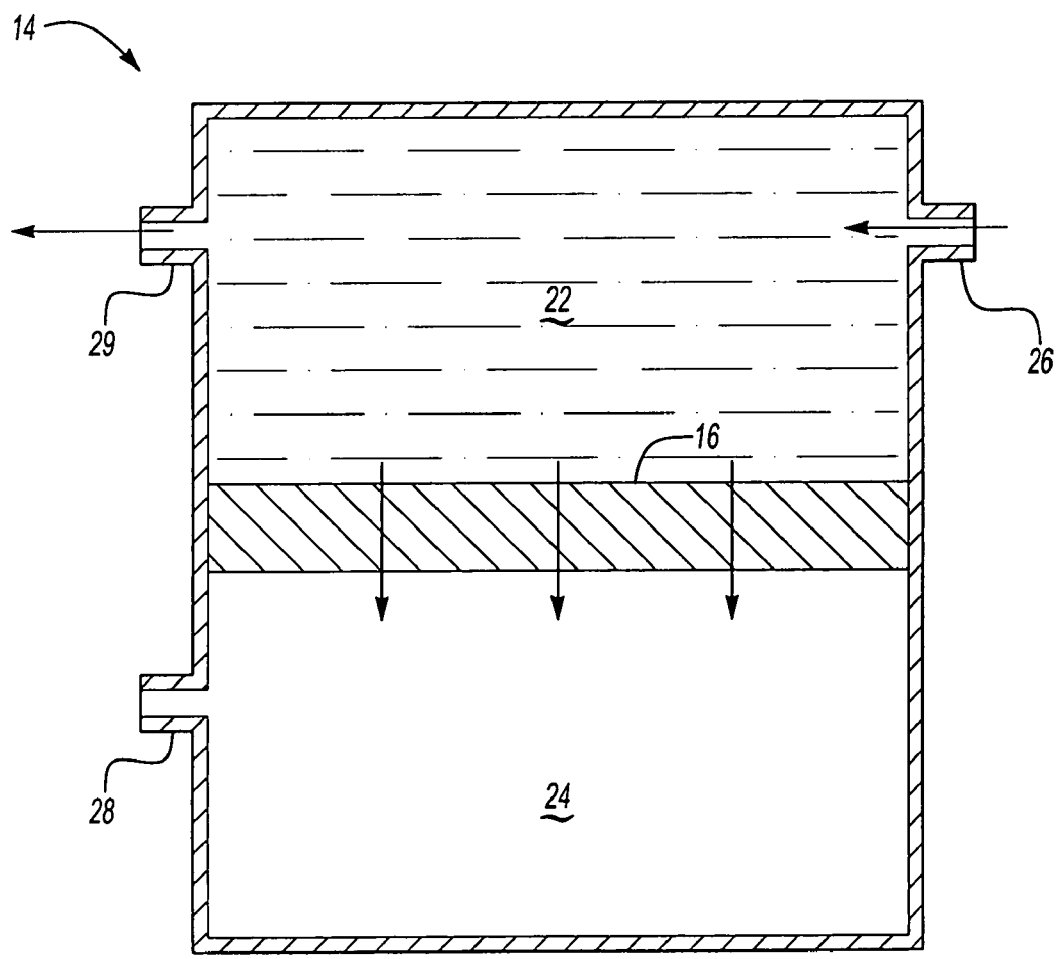
FIG. 2 is a schematic view of an example of a fuel deoxygenator device.

Referring to FIG. 2, the fuel deoxygenator device 14 includes a fuel side 22 and a non-fuel side 24. Fuel enters the fuel side 22 through the inlet 26 and contacts the microporous polymer membrane 16. The microporous polymer membrane 16 allows oxygen, for example, that is dissolved in the fuel to migrate to the non-fuel side 24 of the fuel deoxygenator 14, thus removing the oxygen from the fuel. To promote diffusion, an opening 28 is used to create an oxygen partial pressure differential between the fuel side 22 and non-fuel side 24. Generally oxygen free fuel then leaves the fuel deoxygenator 14 through the outlet 29.

FIG. 3 shows an example of a microporous polymer membrane 16 that would, for example, be used in the fuel deoxygenator device 14 to remove oxygen from fuel. In this example, the microporous polymer membrane 16 is disposed on a porous substrate 30. The microporous polymer membrane 16 is preferably disposed on the fuel side 22 and the porous substrate 30 is preferably disposed on the non-fuel side 24 in the fuel deoxygenator device 14.

The porous substrate 30 is preferably formed of polyvinylidene fluoride (PVDF) and is approximately one hundred micrometers thick. The porous substrate 30 provides strength and support to the microporous polymer membrane 16.

The microporous polymer membrane 16 is preferably formed of an amorphous fluoropolymer by the known process of solution casting; however, one skilled in the art who has the knowledge of this disclosure would recognize the benefits of using other polymers and other forming processes in applying the invention. The microporous polymer membrane is preferably between approximately four and six micrometers thick and includes micropores 32. The micropores 32 are the avenue by which molecules permeate, i.e., migrate, through the microporous polymer membrane 16.

FIG. 4 shows one example of a molecular 2-dimensional view of a known virgin microporous polymer membrane 16. Virgin refers to the polymer membrane having had no further processing after the process of producing the membrane itself. An amorphous portion 34 is made up of polymer chains 36. The polymer chains 36 have no long-range order, i.e., an amorphous morphology. The micropores 32 are formed by the free space in between the polymer chains 36 and can be characterized as having an average size, namely an average diameter 38.

The average diameter 38 of the micropores 32 controls which molecules may migrate through the microporous polymer membrane 16. The average diameter 38 of the micropores 32 of the known virgin microporous polymer membrane 34 is large enough to allow oxygen and a significant amount of hydrocarbon fuel to migrate into and through the microporous polymer membrane 16.

FIG. 5 refers to one example of a molecular 2-dimensional view of a microporous polymer membrane 16 that has been heat treated according to the inventive method. The amorphous portion 40 includes polymer chains 42 that have no long-range order. The micropores 44 are formed by the free space in between the polymer chains 42 and can be characterized as having an average diameter 46. The average diameter 46 of the micropores 44 of the amorphous portion 40 (i.e., heat treated according to the inventive method) is smaller than the average diameter 38 of the micropores 32 of the amorphous portion 34 (i.e., virgin). Thus, the microporous polymer membrane 16 before heat treating according to the inventive method has micropores with a first size, i.e., average diameter 38. After heat treating, the microporous polymer membrane 16 has micropores with a second smaller size, average diameter 46.

The method of heat treating the microporous polymer membrane 16 to produce the smaller micropores 42 includes heating at a predetermined temperature for a predetermined amount of time in an oven. Preferably, measures are taken to conduct the heating in a dust free environment to prevent contamination of the microporous polymer membrane 16.

The predetermined temperature of the oven is equal to or greater than the glass transition temperature of the polymer of the microporous polymer membrane 16. The preferable temperature is between 130° C. and 150° C. The maximum temperature of 150° C. was selected based on the PVDF substrate 30. At temperatures over 150° C. the physical characteristics of the PVDF substrate 30 could become undesirable.

The predetermined time in the oven at a temperature between 130° C. and 150° C. is two hours; however, one of ordinary skill in the art who has the benefit of this disclosure would recognize that the oven temperature and time depends also on the extent of the desired result and the polymer used to form the membrane.

In another example, DuPont Teflon AF2400 is utilized as the polymer of the microporous polymer membrane 16. Teflon AF2400 has an approximate glass transition temperature of 240° C. The predetermined oven temperature is between 130° C. and 150° C. and the predetermined oven time is two hours. These oven conditions are adequate to achieve a smaller average diameter 46 of the micropores 44 as referred to in FIG. 5, however, it should be understood that lower temperatures could be utilized for a longer time or higher temperatures could be utilized for a shorter time to achieve substantially the same result.

Heating an amorphous fluoropolymer microporous membrane at a temperature between 130° C. and 150° C. for two hours allows the polymer chains 42 to relax from a non-equilibrium state to a state of greater equilibrium. When in a state of greater equilibrium, the micropores 44 formed by the free space in between the polymer chains 42 have the smaller average diameter 46.

The smaller average diameter 46 is achieved by way of reducing the diameter of all the micropores 44, by reducing or eliminating a population of larger than average micropores, or by combination thereof.

Alternatively, heating at a temperature below the glass transition temperature or below 130° C. may also yield a similar pore reducing effect; however, more time may be required to achieve the result than for heating above the glass transition or above 130° C. In one example using Teflon AF2400, the oven temperature was as low as 100° C., however, the time required was many times longer than two hours and impractical from a manufacturing standpoint.

The microporous polymer membrane 16 that has been heat treated according to the inventive method is particularly well suited for preventing infiltration of fuel in an aircraft into the micropores 44, although it should be understood that one skilled in the art who has the benefit of this disclosure would recognize the applicability to fluids other than gaseous oxygen and liquid fuel and systems other than aircraft fuel systems such as but not limited to gasoline and diesel systems.

In another example, a virgin microporous polymer membrane was heat treated according to the inventive method. The virgin microporous membrane had a composite micropore average diameter of about thirteen micrometers and included a significant population of micropores having an average diameter of about twenty-three micrometers. After heat treating the virgin microporous polymer according to the inventive method, the microporous polymer membrane had a composite average micropore diameter of about twelve micrometers and no longer had a population of large micropores (i.e., the twenty-three micrometer diameter micropores). In this example, the heat treated microporous polymer membrane is better suited than the virgin microporous polymer membrane to prevent infiltration of liquid into the membrane because of the elimination of the large twenty-three micrometer micropores and the smaller average micropore size. It should be understood that one of ordinary skill in the art who has the benefit of this disclosure would recognize that the size of the micropores and extent of the reduction in size of the micropores when heat treated according to the inventive method will vary with the type of polymer used for the membrane and the heating conditions that are selected.

Figure 6:
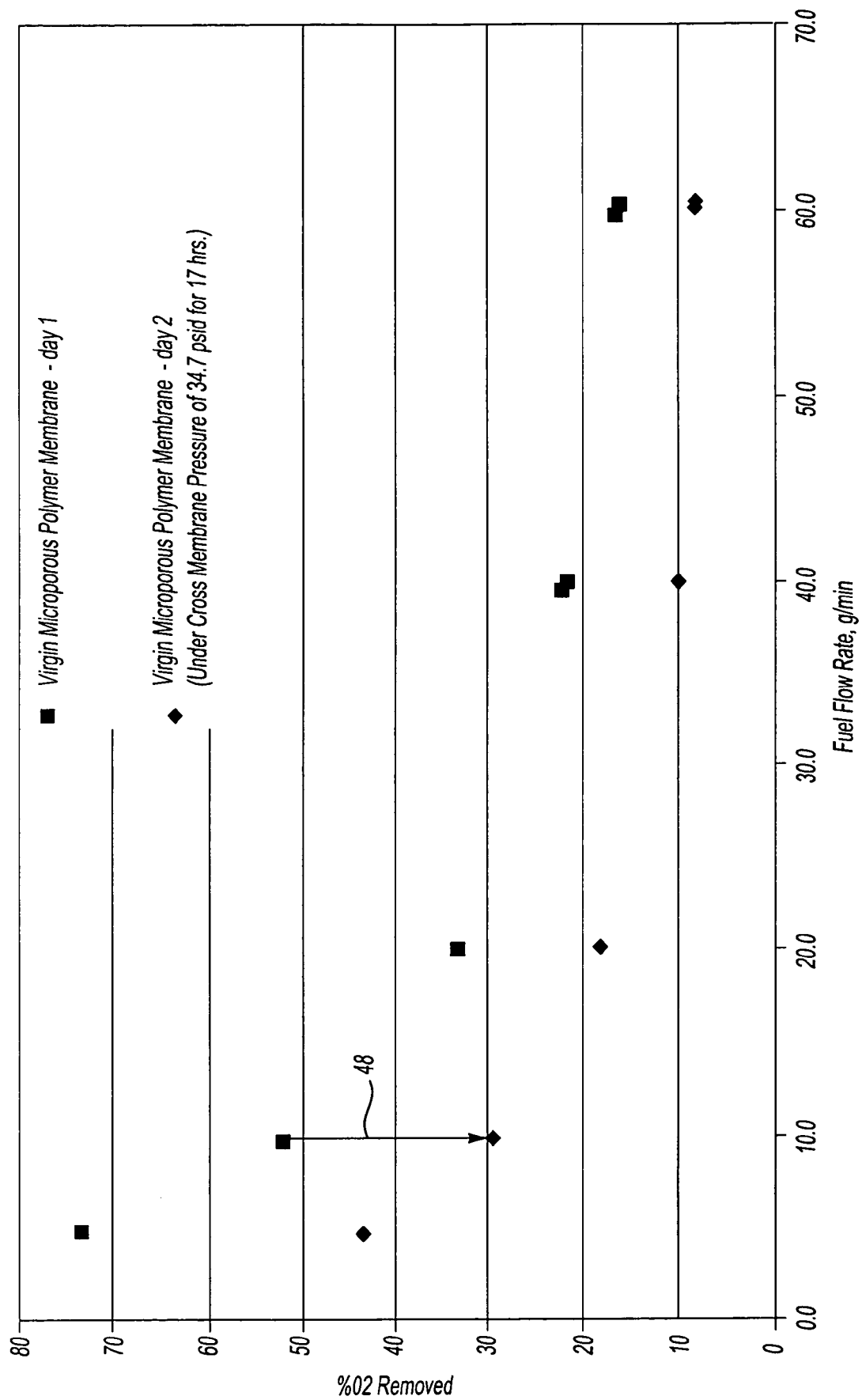
FIG. 6 is an example of the effect of fuel infiltrating a known virgin membrane.
Figure 7:
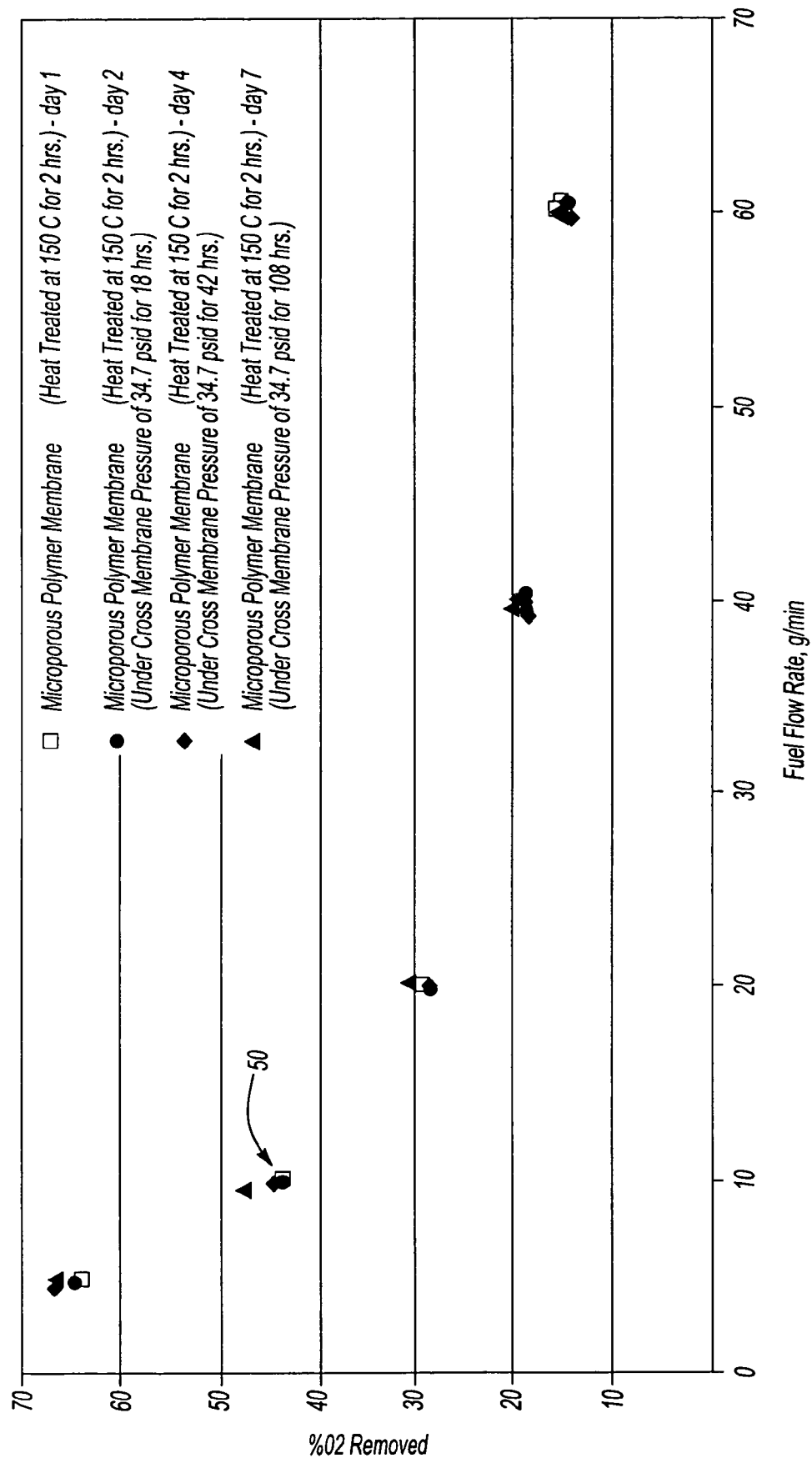
FIG. 7 is one example of a membrane that has been heat treated according to the inventive method and resists infiltration of fuel.

The examples shown in FIG. 6 and FIG. 7 illustrate the beneficial effect of preventing fuel from infiltrating the microporous polymer membrane that has been heat treated according to the inventive method versus a known virgin microporous polymer membrane. In FIG. 6, the line 48 represents the loss in percentage of oxygen removed for a virgin microporous polymer membrane versus a virgin microporous polymer membrane that has been exposed to fuel for seventeen hours. The loss in percentage of oxygen removed is nearly 25%, i.e., the exposed membrane maintains only 50% oxygen removal efficiency compared to the virgin membrane. Once the fuel infiltrates the microporous polymer membrane it hinders the migration of oxygen through the membrane and the membrane becomes less effective in removing oxygen from the fuel. This is shown quite clearly in FIG. 6.

In the example in FIG. 7, the points 50 show no loss in percentage of oxygen removed for microporous polymer membranes that have been heat treated according to the inventive method and exposed to fuel for up 108 hours. The microporous polymer membranes of this example were heat treated at 150° C. for two hours and now prevent fuel from infiltrating. The result is that the membranes continue to be effective in removing oxygen despite exposure to fuel, i.e., an exposed heat treated membrane maintains approximately 100% oxygen removal efficiency compared to a non-exposed heat treated membrane.

The migration of molecules through the microporous polymer membrane 16 is measured as permeability. It should be understood that the microporous polymer membrane 16 that has been heat treated according to the inventive method may suffer a loss in gas permeability compared to the virgin microporous polymer membranes. Although the micropores 44 are large enough to allow migration of molecules such as gaseous oxygen, the smaller average diameter 38 has a hindering effect on such migration.

The invention has been described in an illustrative manner, and it is to be understood that the terminology used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

We claim:

1. A fuel system comprising:
   a fuel storage tank;
   a downstream use for fuel;
   a fluid connection for communicating fuel from said fuel storage tank to said downstream use; and
   a fuel deoxygenator mounted in said fluid connection, said fuel deoxygenator having a microporous polymer membrane disposed therein that defines a fuel passage within said fuel deoxygenator device for flow of fuel therethrough, wherein said microporous polymer membrane is comprised of micropores that that have been reduced in size from a first size to a second size by a heat treatment, said second size being large enough to generally allow migration of a gas through said microporous polymer membrane and small enough to generally prevent migration of fuel into said microporous polymer membrane.

2. The fuel system as recited in claim 1, wherein said microporous polymer membrane is supported by a substrate.

3. The fuel system as recited in claim 1, wherein said heat treatment comprises heating the microporous polymer membrane at a temperature above 100° C.

4. The fuel system as recited in claim 3, wherein said heat treatment comprises heating the microporous polymer membrane at a temperature between about 130° C. and about 150° C. for about two hours.

5. The fuel system as recited in claim 4, wherein said microporous polymer membrane is an amorphous fluoropolymer.

6. A method of preventing a liquid from migrating into a microporous polymer membrane comprising the steps of:
   heating a microporous polymer membrane to a predetermined temperature for a predetermined time to reduce the size of micropores in the microporous polymer membrane from a first size to a second size, the second size being large enough to allow migration of a gas through the membrane and small enough to prevent migration of a liquid into the membrane; and
   disposing said microporous polymer membrane in a fluid separating device.

7. The method as recited in claim 6, wherein the predetermined temperature is above 100° C.

8. The method as recited in claim 7, wherein the polymer of the microporous polymer membrane has a glass transition temperature and the predetermined temperature is greater than the glass transition temperature.

9. The method as recited in claim 7, wherein the polymer of the microporous polymer membrane has a glass transition temperature and the predetermined temperature is about equal to the glass transition temperature.

10. The method as recited in claim 7, wherein the predetermined temperature is between about 130° C. and about 150° C.

11. The method as recited in claim 7, wherein the predetermined time is about two hours.

12. The method as recited in claim 7, wherein the microporous polymer membrane is an amorphous fluoropolymer.

13. The method as recited in claim 7, wherein the fluid separating device is a fuel deoxygenator in a fuel system.

14. The method as recited in claim 7, wherein the fluid separating device is in an aircraft.

15. The method as recited in claim 6, further comprising forming the microporous polymer membrane in a step that is separate and distinct from heating the microporous polymer membrane to reduce the size of the micropores.

16. A microporous polymer membrane comprising micropores that have been reduced in size from a first size to a second size by a heat treatment, said second size being large enough to generally allow migration of a gas through said microporous polymer membrane and small enough to generally prevent migration of a liquid into said microporous polymer membrane, wherein the microporous polymer membrane is an amorphous fluoropolymer.

17. The microporous polymer membrane as recited in claim 16, wherein said heat treatment comprises heating said microporous polymer membrane above 100° C.

18. The microporous polymer membrane as recited in claim 17, wherein the polymer of the microporous polymer membrane has a glass transition temperature and said heat treatment comprises heating said microporous polymer membrane to a temperature greater than said glass transition temperature.

19. The microporous polymer membrane as recited in claim 17, wherein the polymer of the microporous polymer membrane has a glass transition temperature and said heat treatment comprises heating said microporous polymer membrane to a temperature that is about equal to said glass transition temperature.

20. The microporous polymer membrane as recited in claim 17, wherein said heat treatment comprises heating the microporous polymer membrane to between about 130° C. and about 150° C.

21. The microporous polymer membrane as recited in claim 17, wherein said heat treatment comprises heating the microporous polymer membrane for about two hours.

22. The microporous polymer membrane as recited in claim 16, wherein the first size corresponds to the microporous polymer membrane after membrane formation and the second size corresponds to the microporous polymer membrane after the heat treatment.

23. A fuel deoxygenator device comprising:
a fuel side and a non-fuel side separated by a microporous polymer membrane for removing gas from fuel flowing in contact with said microporous polymer membrane on said fuel side, and said microporous polymer membrane comprising micropores that have been reduced in size from a first size to a second size by a heat treatment, said second size being large enough to generally allow migration of said gas through said microporous polymer membrane and small enough to generally prevent migration of said fuel into said microporous polymer membrane.

24. The fuel deoxygenator device as recited in claim 23, wherein said non-fuel side comprises a lower gas partial pressure than said fuel side.

25. The fuel deoxygenator device as recited in claim 24, wherein said gas partial pressure comprises oxygen partial pressure.

* * * * *